3,792,178
SOUR CREAM POWDER
Peter P. Noznick, Charles W. Tatter, and Carl F. Obenauf, Chicago, Ill., assignors to Beatrice Foods Co., Chicago, Ill.
No Drawing. Continuation-in-part of applications Ser. No. 825,675, July 8, 1959, Ser. No. 16,652, Mar. 22, 1960, Ser. No. 149,537, Nov. 2, 1961, and Ser. No. 197,837, May 28, 1962, all now abandoned. This application May 10, 1968, Ser. No. 728,317
Int. Cl. A23c 9/12
U.S. Cl. 426—187
25 Claims

ABSTRACT OF THE DISCLOSURE

Sour cream powder is prepared by adding a coating assisting agent selected from the group consisting of gum acacia, gum tragacanth, corn, wheat and potato starches, acid modified starches, phosphated starches, enzyme modified starches of the previous group, dextrins, pectins, carboxymethyl cellulose, nonfat milk solids, gelatin and casein, homogenizing the mixture and spray drying. Preferably a phosphate is added as a protein peptizing agent. The products with or without the peptizing agent are readily redispersible in water to give stable emulsion.

---

The present application is a continuation-in-part of Ser. No. 825,675, filed July 8, 1959 and now abandoned; Ser. No. 16,652, filed Mar. 22, 1960, Ser. No. 149,537, filed Nov. 2, 1961 and now abandoned, and Ser. No. 197,837, filed May 28, 1962, and now abandoned.

This invention relates to a sour cream powder in which the fat is encapsulated and the powder can be readily reconstituted with water into a smooth cream.

Sour cream is a conventional cultured product with a pH of about 4.4 to 5.0. We have discovered that by adding about 0.5 to 5.0% based on the dry weight of the sour cream of peptizing agent for the protein, notably a salt such as disodium acid phosphate, the insoluble or denatured casein is changed so that it will coat, i.e., enrobe the fat particles, and will not precipitate out when the sour cream is pasteurized, homogenized to disperse finely and coat the fat particles and avoid fat rise, and spray dried to a powder. We have also found that the use of coating assisting agents as hereinafter defined and especially gum acacia and nonfat milk solids will also coat the fat particles and give a spray dried product which is readily redispersible in water with or without the addition of a peptizing agent.

Example 1

Sour cream suitably cultured by conventional procedure having a pH of about 4.6 has added to it 2.5% of a peptizing agent which was disodium acid phosphate based on the dry weight of the sour cream. The mass is suitably mixed with a mechanical paddle agitator, homogenized under about 750 pounds pressure and spray dried. The peptizing agent increases shelf life, i.e., cuts down staleing effect and retards rancidity. The protein is peptized because in the conventional sour cream it has been denatured and hence will not adequately enrobe the fat in its insoluble state when the mixture is subsequently spray dried to a powder. This is accomplished by use of the peptizing agent, thereby overcoming the aforesaid previous difficulty.

Example 2

Example 1 was repeated using sour cream with a pH of 4.4.

Example 3

Example 1 was repeated using sour cream with a pH of 5.0.

Example 4

Each of Examples 1, 2 and 3 was repeated using (a) 2.0% of the peptizing agent and (b) 3.0% of the peptizing agent respectively.

Example 5

Each of the previous examples was repeated homogenizing at (a) 200 p.s.i. and (b) 1500 p.s.i. pressure, respectively. Homogenization breaks down and disperses the fat particles and enrobes the same, and helps to avoid fat rise.

Example 6

Each of the previous examples was repeated, including in the mixture a coating agent, namely, a gum such as gum acacia and corn starch respectively, these agents rendering the mix smooth and easily dryable and reconstitutable with water into a smooth cream. The coating agent is able to encapsulate or enrobe the butter fat. The product would otherwise be hard to dry and the coating agent aids spray or roller drying as ordinary sour cream is difficult to dry.

Example 7

Each of the foregoing examples was repeated and the mixtures were pasteurized at (a) 130° F., (b) 140° F., (c) 150° F. and (d) 160° F. for 30 minutes respectively in the batch prior to homogenizing which latter was carried out at substantially the respective temperatures recited at which pathogenic bacteria will be killed.

Example 8

Each of the foregoing examples was repeated using short time pasteurization respectively at (a) 150° F. for 40 seconds, (b) 160° F. for 15 seconds, and (c) 165° F. for 10 seconds, i.e., for 10 to 40 seconds prior to homogenizing, which latter was carried out at the respective temperatures mentioned, or the mix was cooler to be at lower temperatures as recited in the previous example.

Examples 9, 9a, 9b

In Example 1, instead of disodium acid phosphate, 2.5% of a coating material such as referred to in Example 6 was added, namely, in Example 9, gum acacia, and in a second Example, 9a, a starch. The coating material, although not as effective as disodium acid phosphate, will make the product dryable, by extending the coating capacity of the protein as well as acting as a coating material by itself. In a further Example 9b, mixtures of these coating materials were used in about equal parts. The spray dried products of each of Examples 9, 9a and 9b were readily redispersible in water to give stable suspensions.

Example 10 and related examples

In these examples we produced a spray dried, free-flowing sour cream powder by proceeding according to Example 1 using a peptizing agent, namely, disodium acid phosphate, a coating agent, namely, gum acacia, and an added protein, namely, gelatin. Instead of the disodium phosphate, we carried out examples using one of sodium acid pyrophosphate, tetrasodium pyrophosphate, dipotassium phosphate, potassium polymeta phosphate, potassium polyphosphate and diammonium phosphate, respectively, and mixtures of the various peptizing agents disclosed.

Instead of gum acacia, we used one of gum tragacanth, corn, wheat and potato starches, phosphated starches, acid modified starches, enzyme modified starches of the previous group, dextrins, pectins, whey solids, and carboxymethyl cellulose, respectively, and mixtures of the various coating agents recited.

In lieu of the added protein, we used one of milk solids and casein, respectively, and mixtures of the proteins herein recited.

In these several examples we used the respective materials in various combinations successfully and produced sour cream powders having the advantageous properties above described. The number of examples was multitudinous, but uniformly satisfactory products were obtained.

Example 11

Sour cream suitably cultured by conventional procedure having a pH of about 4.6 had added to it gum acacia. The mass was suitably mixed with a mechanical paddle agitator, homogenized under about 750 pounds pressure and spray dried to give a free flowing sour cream powder containing approximately 82% sour cream solids and 18% gum acacia. The product was readily redispersible in water to give a homogeneous suspension which was stable in water for two hours and longer.

In contrast an acidified product such as that disclosed and claimed in Grelck Pat. 2,009,135 in which the albumin is coagulated and precipitated cannot be reemulsified in water to give a suspension having any stability. This Grelck acknowledges on page 2, col. 1, lines 19–40. In fact it is surprising that a spray dried sour cream can be redispersed in water in the manner of the product of present Example 11 in view of the well known instability of aqueous compositions containing acidified protein.

Example 12a

In this example there was prepared a spray dried, free flowing sour cream powder containing approximately 80% sour cream solids, 15% of a coating material, specifically, gum acacia, 5% of a protein, specifically casein and 2.5% disodium acid phosphate, based on the dry weight of the sour cream. Specifically, cultured sour cream having a pH of about 4.6 had added to it disodium acid phosphate, gum acacia and casein. The mass was suitably mixed with a mechanical paddle agitator, homogenized under about 750 pounds pressure and spray dried.

Example 12b

Example 12a was repeated but the disodium acid phosphate was omitted. The spray dried powder was readily redispersible in water to give a stable emulsion or suspension.

In lieu of gum acacia as the coating agent in Examples 12a and 12b, we also used gum tragacanth, corn, wheat and potato starches, phosphated starches, acid modified starches, enzyme modified starches of the previous group, dextrins, pectins, whey solids, and carboxymethyl cellulose, and mixtures of the coating agents recited.

In lieu of casein as the added protein in Examples 12a and 12b, we also used gelatin, milk solids, and mixtures of the added proteins recited. Here again, the powders were obtained by the numerous specific examples using 70%, 80% and 95%, respectively, i.e., 70–95% sour cream solids, with 5%, 10%, 15% and 20%, respectively, i.e., 5–20%, of the coating material, and 5%, 7% and 10%, respectively, i.e., 5–10%, of the added protein, the several materials being used alone or in various mixtures as recited above.

Example 13

These examples were carried out in accordance with the procedure of Example 1 and there was prepared a spray dried, free-flowing sour cream powder containing 90% of sour cream solids, 2.5% disodium phosphate and 7.5% of an emulsifying agent, namely, glycerol monostearate. In other examples, instead of using glycerol monostearate, we used one of glycerol monooleate, glycerol lactopalmitate, glycerol lactostearate, propylene glycol monostearate, polysorbitan monostearate, sorbitan monostearate, glycerol acetomonostearate and lecithin, respectively, and mixtures of these emulsifying agents.

Example 13a

In this example, which was similar to Example 13 the emulsifying agent was a mixture of glycerol monostearate and glycerol lactostearate in about equal parts.

Example 14

A spray dried, free-flowing sour cream powder was prepared containing 92.5% sour cream solids and 7.5 of glycerol monostearate. Cultured sour cream having a pH of about 4.6 had added to it glycerol monostearate. The mass was suitably mixed with a mechanical paddle agitator, homogenized under about 750 pounds pressure and spray dried. In place of glycerol monostearate mixtures of the emulsifying agents set forth in Example 13 can be used.

Example 14a

A spray, free-flowing sour cream powder was prepared containing 82.5% sour cream solids, 10% nonfat milk solids and 7.5% glycerol monostearate. Cultured sour cream having a pH of about 4.6 had added to it nonfat milk solids and glycerol monostearate. The mass was suitably mixed with a mechanical puddle agitator, homogenized under about 750 pounds pressure and spray dried. The spray dried product was readily redispersible in water to give stable suspensions.

Example 15

Example 6 was repeated utilizing in one instance gum acacia, and in another instance corn starch as the coating agent, and in a further instance mixtures of these coating agents in equal parts, and there was added an emulsifying agent in each such example, as described in connection with Example 13, namely, glycerol monostearate. The other emulsifying agents and mixtures of the various emulsifying agents were also employed successfully as described in Example 13.

Example 15a

This example was like Example 15 except that the disodium phosphate was omitted and about 10% nonfat milk solids (skim milk solids) were included in place of the phosphate.

Example 16

In this example 20% of skim milk (serum solids, nonfat) based on the dry weight of the final powder was added to an 18% butterfat cream before culturing. Thereafter the procedure referred to in the proceeding examples was carried out using such cultured sour cream product in lieu of the conventional product in which the skim milk is not usually employed. The mixed product is cultured, of course, in the customary manner. The amount of added serum solids, nonfat, will vary between 5 and 25% on a dry basis of the finished powder.

This example differs from those previously described in that the sour cream solids are produced from a cultured cream including the skim milk, i.e., serum solids, nonfat, as described, instead of the conventional sour cream solids. All of the examples previously mentioned can utilize this cultured mixture of sour cream and skim milk and produce satisfactory spray dried, free-flowing sour cream powders.

Example 16a

20% of skim milk (serum solids, nonfat) based on the dry weight of the final powder was added to an 18% butterfat cream before culturing. The cultured product was homogenized and spray dried to give a free-flowing powder which was readily dispersible in water to give a stable suspension.

Example 16b

To sour cream suitably cultured and having a pH of 4.6 were added 20% of skim milk (serum solids, nonfat) in an amount of 20% of the dry weight of the sour cream product. The mass was suitably mixed with a mechanical paddle agitator, homogenized under about 750 pounds pressure and spray dried to give a free-flowing powder which was readily dispersible in water to give stable suspensions. In fact, the water suspensions were stable for 2 hours and longer.

Example 16c

Example 16b was repeated but only 5% of nonfat milk solids were employed, based on the dry weight of the sour cream product. The spray dried product was similar to that in Example 16b.

Example 16d

Example 16b was repeated but 25% of nonfat milk solids were employed based on the dry weight of the sour cream product. The spray dried product was similar to that in Example 16b.

Example 17

This example is like Example 16, except that instead of adding skim milk to provide the serum solids, nonfat, there is incorporated in the cream whole milk, about 20% based on the dry weight of the final powder. The total amount of butterfat in the cream and in the whole milk is adjusted in one or the other, or both, to about 18%, so as to give a desired total butterfat in the final powder. This, of course, is occasioned by the presence of the butterfat in the whole milk.

The cultured sour cream so produced is thereafter used in any of the aforesaid examples, as is the case with the product of Example 16 to provide a source of sour cream solids.

While we have referred to 18% butterfat cream, it is to be understood that the butterfat content of the cream or the cream and whole milk may be as low as 15% and as high as 22%. An 18% butterfat cream product is preferred, and it is also preferable to adjust the butterfat content to 18% as described above. The amount of added serum solids, nonfat, provided by the whole milk will vary between about 5 and 25% on a dry basis of the finished powder, substantially as in Example 16.

Example 18

In this example sweet cream buttermilk is added to an 18% butterfat cream in amount of 20% on a dry basis before culturing and thereafter, as in Examples 16 and 17, the mixture is cultured in the conventional manner. The cultured product provides a satisfactory source of sour cream solids for use in any of the previous examples.

The added sweet cream buttermilk can be between 5 and 25% on the dry basis of the final powder product.

The advantages of using the sour cream solids produced from Examples 16, 17 and 18 are substantial in that; the fermentation proceeds better, and the viscosity of the sour cream mixture in the culturing is reduced. In each example peptizing agents, e.g., disodium acid phosphate, can be added, and while their use is preferred, their inclusion is optional. That is to say, when the source of sour cream solids is derived from Examples 16 to 18, the peptizing agent may be omitted, in the foregoing Examples 1 to 15a.

Example 19

In this example, for the purposes of this invention, cultured buttermilk is added to an 18% butterfat cream in amount of 20% on a dry basis before culturing the mixture. The mixture is thereafter cultured. The cultured buttermilk constitutes the starter for the buttermilk cream-milk mixtures to produce the sour cream. This source of sour cream solids may be used successfully with any of the foregoing Examples 1 to 15a.

Examples 20a and 20b

In this example, for the purposes of this invention, the sour cream is cultured in any conventional fashion and is then mixed with 20% on a dry basis of cultured buttermilk. This buttermilk in one instance (Example 20a) was conventional cultured sweet cream buttermilk and in another example (Example 20b) was the usual cultured buttermilk made from skim milk. This source of sour cream solids may likewise be used successfully with any of the previous Examples 1 to 15a.

Example 21

In this and related examples and following the procedures of the various examples utilizing the sour cream solids from Examples 16 to 20, the skim milk or sweet milk or cultured buttermilk as the case may be and the cultured sour cream as recited in these examples are separately but simultaneously fed to the spray nozzle of the spray drier and there admixed, i.e., in the nozzle and the mixture spray dried. In this manner drying is substantially facilitated. Thus, the ingredients of the mixture to be spray dried are separately fed to the spray nozzle, mixed there and dried. Also, in preferred examples, a mixture containing respectively, in addition to the other ingredients recited in the above examples, one or the other of the skim milk or sweet milk or cultured buttermilk, on the one hand, or the cultured sour cream on the other hand, are separately but simultaneously fed to the spray nozzle and dried. Such milk or the cultured sour cream is introduced separately but at the same time to the aforesaid mixture at the spray nozzle, or (1) the other ingredients, (2) the milk, and (3) the cream, are simultaneously but separately introduced to and mixed in the spray nozzle and dried.

Example 22

To an 18% cream there is added condensed skim milk and the total solids adjusted to about 25%. The mixture is pasteurized in the customary manner (145° F. for 30 minutes) and then homogenized first at 800 p.s.i. and then at 400 p.s.i. The homogenized mixture is cooled to about 70° F. and the usual culture is added and the mixture cultured for 14 hours (we have also used 15 hours and 16 hours with success), the culturing taking place with the mixture at 70° F.

Thereafter, the mixture is repasteurized at 160° F. for 30 minutes and again homogenized at about 150° F.–160° F. as described, and spray dried to give a product readily redispersible in water to give a stable suspension.

In another example, following the last homogenization at 150° F.–160° F., the mixture is cooled to 50° F. (in some examples it was cooled to 60° F.). The cooled mixture was preheated quickly to about 125° F. and spray dried.

In another example we eliminated the cooling and spray dried the repasteurized, second homogenized mixture having temperatures of about 126° F., 150° F., 155° F. and 160° F. as recited above.

In some cases it is desirable to utilize a peptizing agent as described above, and this is introduced preferably after the second repasteurizing step utilizing disodium acid phosphate or one of the peptizing agents heretofore mentioned.

While we have referred in this example to cream and skim milk, the initial mixture may be any of those referred to herein, e.g., contain cream and whole milk, to which mixture is added citric acid in amount to develop acetyl methyl carbinol which we find is an appreciable aid to the culturing.

As explained above, there can be used in addition to, or in place of, the above recited coating materials in the foregoing examples, emulsifying agents such as glycerol lactostearate, propylene glycol monostearate, polysorbitan monostearate, sorbitan monostearate, glycerol acetomonostearate, lecithin, and mixtures thereof. These serve to improve the emulsification characteristics of the fat phase, prior to homogenization and spray drying. The use of the above emulsifiers also aids in the redispersion of the powdered powder when rehydrated. These emulsifiers are used alone or in combination with each other to give the final desired effect. The range will be from 0.1% to 10% emulsifier on a dry basis.

In all examples the preferred procedure was to mix the ingredients at about room temperature, e.g., 72° F. and then pasteurize by heating just prior to homogenizing as stated.

While we have referred to disodium acid phosphate as the peptizing agent, others can be used in the foregoing examples, notably sodium acid pyrophosphate, tetrasodium pyrophosphate, dipotassium phosphate, potassium polymeta phosphate, potassium polyphosphate, and diammonium phosphate. In fact, all compatible salts of the phosphate group may be used.

While we have also mentioned gum acacia or starch as the coating or enrobing agent, others equally compatible with the present acid conditions can be used in the examples, e.g., gums such as gum acacia, gum tragacanth, starches such as corn, wheat or potato, phosphated starches, acid modified starches, enzyme modified starches of the previous group, dextrins, pectins, whey solids, cellulose derivatives, modified celluloses, i.e., carboxymethyl cellulose methyl cellulose.

A suitable added non-milk or milk protein may be included in the mix prior to pasteurization and homogenization, notably skim milk solids, casein, and gelatin.

The protein also acts to encapsulate the fat like the native occurring proteins, i.e., is an additional coating agent, and any protein which is compatible and stable at pH 4.5 to 5.0 in the mix is used. Gelatin of the "A" type Isoelectric Point (7.0–8.3) is preferred.

The peptizing agent and the coating agent aid in the reconstruction with water to improve dispersibility and produce a smooth, creamy body. Without the peptizing agent or the coating agent on reconstitution with water, a curdy mass is produced from which the solids separate or precipitate out. The coating agent improves the product appreciably in helping to secure adequate encapsulation and on reconstitution with water, improves the dispersibility and precludes forming a curdy mass characterized by solids separation and precipitation even when no peptizing agent is included.

The peptizing agents, the coating agents and the added proteins, as explained, preferably are compatible with the acidity characteristic of the sour cream, e.g., pH 4.4 to 5.0.

In this application the amount of sour cream solids in some examples was as high as 97% or slightly more and even 99%.

We claim:

1. The process of making a sour cream powder comprising adding to sour cream 0.5% to 5% by weight of a sodium, potassium or ammonium phosphate as a protein peptizing agent, homogenizing the mixture and spray drying the mixture to produce a powder which is readily redispersible in water.

2. A process according to claim 1 wherein there is also included 0.1 to 10% of an emulsifying agent selected from the group consisting of glycerol monostearate, glycerol monooleate, glycerol lactopalmitate, glycerol lactostearate, propylene glycol monostearate, polysorbitan monostearate, sorbitan monostearate, glycerol acetomonostearate and lecithin prior to homogenizing.

3. The process according to claim 2 in which 5 to 30% of a coating assisting agent selected from the group consisting of gum acacia, gum tragacanth, corn, wheat and potato starches, acid modified starches, phosphated starches, enzyme modified starch of the previous group, dextrins, pectins, whey solids, gelatin, carboxymethyl cellulose, milk solids and casein is added to the mixture before homogenizing.

4. Readily water redispersible sour cream powder comprising sour cream and 0.5 to 5% by weight of a sodium, potassium or ammonium phosphate as a protein peptizing agent.

5. A powder according to claim 4 wherein the petizing agent is selected from the group consisting of disodium acid phosphate, sodium acid pyrophosphate, tetrasodium pyrophosphate, dipotassium phosphate, potassium polyphosphate and diammonium phosphate.

6. A spray dried free-flowing sour cream powder according to claim 5 containing about 97% sour cream solids and about 3% disodium phosphate.

7. A spray dried free-flowing powder according to claim 5 wherein there is also included 5 to 30% of a coating agent selected from the group consisting of gum acacia, gum tragacanth, corn, wheat and potato starches, phosphated starches, acid modified starches, enzyme modified starches of the previous group, dextrins, pectins, whey solids, carboxymethyl cellulose, gelatin, milk solids and casein.

8. A spray dried free-flowing sour cream powder according to claim 7 and containing in addition 0.1 to 10% of an emulsifying agent selected from the group consisting of glycerol monostearate, glycerol monooleate, glycerol lactopalmitate, glycerol lactostearate, propylene glycol monostearate, polysorbitan monostearate, sorbitan monostearate, glycerol acetomonostearate and lecithin.

9. A spray dried free-flowing sour cream powder according to claim 5 containing 85 to 95% sour cream solids, 0.5 to 5% of the peptizing agent and 0.1 to 10% of an emulsifying agent selected from the group consisting of glycerol monostearate, glycerol monooleate, glycerol lactopalmitate, glycerol lactostearate, propylene glycol monostearate, polysorbitan monostearate, sorbitan monostearate, glycerol acetomonostearate and lecithin.

10. Sour cream powder according to claim 4 including 0.1 to 10% of an emulsifying agent selected from the group consisting of glycerol monostearate, glycerol monooleate, glycerol lactopalmitate, glycerol lactostearate, propylene glycol monostearate, polysorbitan monostearate, sorbitan monostearate, glycerol acetomonostearate and lecithin.

11. A spray dried free-flowing sour cream powder readily redispersible in water to produce a stable suspension comprising 95 to 70% sour cream solids and 5 to 30% of a coating agent selected from the group consisting of gum acacia, gum tragacanth, corn, wheat and potato starches, acid modified starches, phosphated starches, enzyme modified starches of the previous group, dextrins, pectins, carboxymethyl cellulose, nonfat milk solids, gelatin and casein.

12. A spray dried readily redispersible powder according to claim 11 consisting essentially of sour cream solids and 5 to 30% of gum acacia.

13. A spray dried readily redispersible powder according to claim 12 consisting essentially of 82% sour cream solids and 18% gum acacia, said powder upon being redispersed in water forming a suspension which is stable for at least two hours.

14. A spray dried free-flowing sour cream powder readily dispersible powder according to claim 11 consisting essentially of sour cream solids and 5 to 30% of nonfat milk solids.

15. A product according to claim 14 wherein the nonfat milk solids are skim milk solids.

16. A product according to claim 15 consisting essentially of 80% sour cream solids and 20% skim milk solids, said product being characterized by being readily redispersible in water to give a suspension which is stable for at least two hours.

17. A spray dried product according to claim 11 consisting essentially of sour cream solids and 5 to 30% of gelatin.

18. A process of preparing the product of claim 11 consisting essentially of adding to sour cream 5 to 30% of the coating agent, homogenizing the mixture and then spray drying the mixture.

19. A process according to claim 18 wherein the coating agent is gum acacia and the composition consists essentially of the sour cream and gum acacia.

20. A process according to claim 18 wherein the coating agent is skim milk solids and the composition consists essentially of the sour cream and skim milk solids.

21. A process comprising redispersing the product of claim 11 in water to produce a stable suspension.

22. A process according to claim 21 wherein the spray dried product consists essentially of sour cream powder and gum acacia.

23. A process according to claim 22 wherein the spray dried product consists essentially of 82% sour cream powder and 18% gum acacia.

24. A process according to claim 21 wherein the spray dried product consists essentially of nonfat milk solids and sour cream powder, the nonfat milk solids being 5 to 25% of the total of nonfat milk solids and sour cream powder.

25. A process according to claim 24 wherein the spray dried product consists essentially of 80% sour cream powder and 20% skim milk solids.

References Cited

UNITED STATES PATENTS

| | | | |
|---|---|---|---|
| 2,018,394 | 10/1935 | Axelrod | 99—59 |
| 2,399,565 | 4/1946 | North et al. | 99—56 |
| 2,645,579 | 7/1953 | Kempf et al. | 99—56 |
| 2,671,729 | 3/1954 | Fear et al. | 99—56 |
| 2,719,793 | 10/1955 | Page et al. | 99—59 |
| 1,800,501 | 4/1931 | Bornegg | 99—206 |
| 2,913,342 | 11/1959 | Cameron et al. | 99—123 |

DAVID M. NAFF, Primary Examiner

U.S. Cl. X.R.

426—43, 98, 358, 471